United States Patent
Johnson et al.

(10) Patent No.: US 6,732,230 B1
(45) Date of Patent: May 4, 2004

(54) METHOD OF AUTOMATICALLY MIGRATING INFORMATION FROM A SOURCE TO AN ASSEMBLAGE OF STRUCTURED DATA CARRIERS AND ASSOCIATED SYSTEM AND ASSEMBLAGE OF DATA CARRIERS

(75) Inventors: Stephen B. Johnson, Colorado Springs, CO (US); Bradley J. Davis, Colorado Springs, CO (US); Paul Ernest Soulier, Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/421,844

(22) Filed: Oct. 20, 1999

(51) Int. Cl.[7] ........................... G06F 12/00; G06F 13/00

(52) U.S. Cl. ........................... 711/114; 711/4; 711/170

(58) Field of Search ........................... 711/114, 165, 711/170, 112–113, 2, 4–5, 115; 710/8, 10, 13, 104; 714/5–7

(56) References Cited

U.S. PATENT DOCUMENTS

| | | | | |
|---|---|---|---|---|
| 5,502,836 A | * | 3/1996 | Hale et al. ................... | 711/170 |
| 5,895,485 A | * | 4/1999 | Loechel et al. .............. | 711/119 |
| 6,052,759 A | * | 4/2000 | Stallmo et al. .............. | 711/114 |
| 6,282,619 B1 | * | 8/2001 | Islam et al. .................. | 711/165 |
| 6,347,359 B1 | * | 2/2002 | Smith et al. ................. | 711/114 |
| 6,442,659 B1 | * | 8/2002 | Blumenau .................... | 711/162 |

OTHER PUBLICATIONS http://www.mkdata.dk/click/module4c1.htm; *The Optic Media (CD–ROMs and DVD)*; printed Sep. 13, 1999, pp. 1–7.
http://www.acnc.com/raid.html; *AC&NC Raid Technology, RAID O: Striped Disk Array without Fault Tolerance*; printed Aug. 25, 1999, pp. 1–10.
http://www.mkdatda.dk/click/module4a.htm; *Drives are storage media*; printed Sep. 13, 1999, pp. 1–4.
http://www.mkdata.dk/click/module6a1.htm; *About file systems: DOS formatting, FAT, etc.*; printed Sep. 13, 1999, pp. 1–4.
Floyd, Thomas L., *Digital Fundamentals*, 5th edition, 602–611 (1994).
http://www.ciprico.com/raid.html; *RAID OVERVIEW, Ciprico*; printed Aug. 25, 1999, pp. 1–2.
http://www.baydel.com.com/tutorial.html; *RAID Tutorial, Baydel*; printed Aug. 25, 1999, pp. 1–4.

* cited by examiner

*Primary Examiner*—Denise Tran
(74) *Attorney, Agent, or Firm*—Cochran Freund & Young, LLC

(57) ABSTRACT

A system for automatically migrating a portion of a collection of information located on source data carrier(s) into an assemblage of data carriers, having: a computer memory for pass-through of a first strip of the collection; the assemblage has at least a first storage medium to which at least a first sub-portion of the first strip is written from computer memory; and once the portion of the collection has been so migrated according to a predetermined structure, a remaining portion of the collection can be written to the source data carrier (to include the source data carrier in the assemblage), the remaining portion being ordered (crunched) in conformity with the predetermined structure.

19 Claims, 5 Drawing Sheets

METHOD OF AUTOMATICALLY MIGRATING INFORMATION FROM A SOURCE TO AN ASSEMBLAGE OF STRUCTURED DATA CARRIERS AND ASSOCIATED SYSTEM AND ASSEMBLAGE OF DATA CARRIERS

BACKGROUND OF THE INVENTION

In general, the present invention relates to computer storage systems that use multiple disk drives combined into an array of disk drives that 'appears' to a host computer as a single logical storage unit that includes fault-tolerance characteristics and yields better overall performance. It has been found that this type of disk array can be made more fault-tolerant by redundantly storing information/data in various ways over the multiple drives, including any of the established RAID (which stands for Redundant Array of Independent Disks) architectures/levels 0 through 5, and subsequent variations/hybrids thereof, whether mapped as hardware- or software-based RAID. More particularly, the invention relates to a new system and unique method for migrating information/data stored on a source volume into a RAID structured assemblage of data carriers whereby a separate back-up disk (or other external storage media) is not needed and the source data carrier can become part of the RAID structured assemblage.

Storage Media, File Systems, Formatting, and Disk Start-up

A storage medium/media can be any data carrier or recording medium into/onto which information (such as data) can be read/copied, such as magnetic (diskettes, hard disks, Iomega's ZIP®/JAZ®/Click!™ disks, tapes, drums, core, thin-film, etc.), optic (CD-ROM, CD-E, CD-R, CD-RW, DVD, and other devices whereby readout is with a light-source and photodetector), and magneto-optic media (media for which optical properties can be changed by an applied magnetic field—used in high end drives). Before data can be written to a storage medium it must be 'formatted' (organized and prepared to receive data). In the case of a formatting a disk, a file system is generally 'burned-in'. Many file system types are currently in use, such as: FAT/FAT16/FAT32 (File Allocation Table) for DOS/Windows 95/98® PC's, HPFS (High Performance File System) used with OS/2 server disks, NTFS (NT File System) used with Windows NT®, ISO 9660 for CD-ROMs, ISO 13346 for DVDs, UDF (Universal Disk Format) for bigger-capacity disks like DVD RAM, Novell's NetWare® server operating system has its own proprietary file system, and UNIX-based servers have their own filing system.

The file system on a disk, for example, operates as an interface between the operating system and the drive in which the disk is located. When a software application, such as MS Word, is asked by a PC user to read a file from a disk, the operating system on that computer engages the file system to open the file. The file name can include a 'drive letter' for the drive associated with the disk on which the chosen file is located. Since the file system includes information about physical location of individual files on the hard drive, the file system is engaged to find the relevant physical location on the hard drive, reads the data there, then delivers it to the operating system. During formatting, a disk (such as the hard disk found in a PC's hard drive, Iomega Corporation's portable ZIP®/JAZ®/Click!™ disks, and diskettes) is divided into multi-byte sectors (512-bytes, for example) distributed along concentric 'tracks'. A hard disk formatted using FAT, for example, has its administrative data stored on an outer track sector(s). Each hard disk, and if partitioned each partition of the disk, often contains four areas in FAT (this depends upon the Partition Type): (1) a boot record, generally in the first sector, (2) FAT administrative data (usually two identical areas), (3) the root directory, and (4) the data area where file information and subdirectories, beyond the root directory, are gathered in clusters (cluster size depends on disk size) locatable by the file system for reading. The formatting of a CD-ROM and a DVD is different as these disks have one-long spiral track divided into identifiable sectors.

A physical hard disk can be divided into different partitions, each of which (for example, in systems running Windows 95® and Windows NT®) can be treated as logically-separate drives. For example, such partitioning of a PC hard drive is usually done by a program called FDISK. A boot record is found on every hard disk (regardless of its specific file system) and contains information about the disk or its partitions. Boot record information enables the file system to handle the disk and also includes a small program used during system start-up. The root directory of a FAT partition is a listing of files and other directories on the respective partition/disk. The root directory of a hard disk with a FAT system, has 512 file or directory 'entrances' and is unique from other directories in that it is of a fixed size and is located in the same physical location.

When a hard disk has been partitioned, thus creating each partition into a 'logical drive' as perceived by the computer's operating system, the file system must be given information allowing it to recognize this partitioning. Information about the physical location of the beginning and the end of each partition, called the Master Boot Record (MBR)—because it describes the entire hard disk, is stored in the first sector of the physical hard disk. Then, at the beginning of each partition (or, logical drive) is a boot record describing the partition that follows.

Once a computer has been powered-up and its start-up program has finished POST (Power On Self Test) and the loading of BIOS (Basic Input/Output System) routines, the boot process begins. First, the MBR is read and the sector number of the primary partition's boot record is located. Any hard disk that has been partitioned has a primary partition (for example, a drive-letter C: can be assigned) from which booting of the computer takes place and the operating system is read (the small boot program in the primary partition is engaged to activate the loading of the operating system files—which are stored, in a DOS-based PC, as hidden system files in the primary partition).

BRIEF HISTORY OF RAID

In the late-1980's, a paper entitled "A Case for Redundant Arrays of Inexpensive Disks (RAID)" was published by authors from the University of California Berkeley, that described various types of disk arrays. The basic idea of RAID was to combine multiple small, what they deemed 'inexpensive' disk drives into an array of disk drives which yields performance exceeding that of a Single Large Expensive Drive (SLED) and is perceived by a host computer as a single logical storage unit or drive. RAID disk arrays, which are interface-independent, are made fault-tolerant by redundantly storing information in various ways. Five types of array architectures, RAID-1 through RAID-5, were originally defined in this paper, each providing disk fault-tolerance. Another level, RAID-0, has emerged which is more-correctly a 'non-redundant' array of disk drives.

Fundamental to RAID is "striping" of magnetic media, which is a method of concatenating multiple drives into one logical storage unit by partitioning the storage space of each drive in the array into strips (or stripes) which may be as small as one sector of the disk (512 bytes) or as large as several megabytes. These strips are then interleaved round-robin, so that the combined space is composed alternately of strips from each drive. In effect, the storage space of the drive array is shuffled like a deck of cards. Often, the type of application environment in which the RAID is used, I/O or data intensive, will determine whether large or small strips are used.

The 'Original' RAID Levels

RAID Level 0, which is technically not redundant, has data that is split across drives—thus, it's commonly referred to as "striping"—resulting in higher data throughput. Since no redundant information is stored, performance is very good, but the failure of any disk in the array results in data loss. RAID Level 1 provides redundancy by writing all data to two or more drives—thus, it's commonly referred to as "mirroring". Since one drive is used to store a duplicate of the data, the cost per megabyte is high. The performance of a level 1 array tends to be faster on reads and slower on writes compared to a single drive, but if either drive fails, no data is lost. RAID Level 2, which uses Hamming error correction codes, is intended for use with drives which do not have built-in error detection. All SCSI drives support built-in error detection, so this level is of little use when using SCSI drives (see SCSI explanation below). RAID Level 3 is similar to Level 4 except that Level 3 stripes data at a byte level across several drives, with parity stored on one drive (byte-level striping requires hardware support for efficient use). RAID Level 4 stripes data at a block level across several drives, with parity stored on one drive (this parity information allows recovery from the failure of any single drive). The performance of a Level 4 array is very good for reading data, or "reads" (as is true for Level 0). Writing data ("writes"), however, require that parity data be updated each time. Because only one drive in the RAID 4 array stores redundant data, the cost per megabyte of a Level 4 array can be fairly low. RAID Level 5 is similar to Level 4, but distributes parity among the drives (RAID-5 is popular). Because parity data must be skipped on each drive during reads, however, the performance for reads tends to be considerably lower than a Level 4 array.

Hardware RAID

A "hardware RAID" based system manages the RAID subsystem array independently from the host computer and presents to the host computer only a single logical disk per RAID array. Hardware RAID requires that each subsystem have a dedicated RAID controller. A SCSI controller-based hardware solution allows the controller to span the RAID subsystem over multiple SCSI channels. An external SCSI hardware solution moves the RAID handling "intelligence" into a controller that is located as part of the external RAID subsystem.

Hardware vs. Software RAID

Just like any other computer software application, a "software-RAID" array occupies host system memory and is host operating system dependent—therefore, the performance of a software-based array directly depends upon server CPU performance and load. Because software-RAID competes with other applications running concurrently on a host CPU, software-based arrays may degrade overall server performance. Hardware-RAID arrays do not occupy any host system memory, and hardware-RAID does not depend on the host operating system. Thus, except for the array functionality, hardware-based RAID schemes have very little in common with software-based implementations. Hardware-RAID arrays are highly fault tolerant and the array logic is based in hardware (software is not required to boot). A RAID-array implemented in software can only be functional when the array software has been read from the disks and is memory-resident. Software-based implementations commonly require a separate boot drive, not included in the array.

BRIEF BACKGROUND OF SCSI

The widely-used small computer system interface (SCSI) protocol was developed for industry groups, under the American National Standards Institute (ANSI) and International Standards Organization (ISO) guidelines, to provide an efficient peer-topeer I/O bus. Devices that conform with the mechanical, electrical, timing, and protocol requirements (including the physical attributes of I/O buses used to interconnect computers and peripheral devices) of the SCSI parallel interface will inter-operate. This allows several different peripherals (hard disk drives, removable disk drives, tape drives, CD-ROM drives, printers, scanners, optical media drives, and so on) to be added at the same time to a host computer without requiring modifications to the generic system hardware. The working draft of the SCSI Parallel Interface-2 Standard (SPI-2), as modified (Rev. 16, dated Oct. 14, 1997), defines the cables, connectors, signals, transceivers, and protocol used to interconnect SCSI devices. The SPI-2 working draft states that a SCSI bus consists of all the conductors and connectors required to attain signal line continuity between every driver, receiver, and terminator for each signal. In operation, a SCSI bus is a bidirectional, multimaster bus which can accommodate peer to peer communications among multiple computer processing units (CPUs) and multiple peripheral devices. A SCSI device is a device (any computer peripheral) containing at least one SCSI port and the means to connect the drivers and receivers to the bus.

A SCSI primary bus is one that provides for and carries 8-bit or 16-bit data transfer. A SCSI secondary bus carries an additional 16-bit data bus that, when used in conjunction with a 16-bit primary bus, provides for a 32-bit data transfer path (although the latter is not, yet, widely used). SCSI devices may connect to a bus via 8-bit, 16-bit, or 32-bit ports. To date, SCSI parallel interface devices may be implemented with either 50, 68, or 80 pin connectors (whether shielded or unshielded). Eight-bit devices are referred to as "narrow" devices (carried by 50 pin cables and connectors) and devices which permit parallel transfer of 16-bits or 32-bits at a time are called "wide" devices (carried by cables and connectors with at least 68 pin). Narrow and wide, as used in connection with SCSI compliant systems, refers to width of the data path. Data travels fast over SCSI buses, with Ultra SCSI data transfer speeds up to 40 MBps, wide Ultra2 LVD up to 80 MBps, and wide Ultra3 up to 160 MBps. As it is well known, a typical data transfer operation over a SCSI bus between a SCSI controller (or "host adapter") located in a host computer system, to a target device (such as a disk drive) has seven SCSI "phases": (1) ARBITRATION, (2) SELECTION, (3) RESELECTION, (4) COMMAND, (5) DATA, (6) STATUS and (7) MES- SAGE. For example, during the COMMAND phase, a SCSI command is transferred from the host adapter to a target (drive); and so on. Host adapter functional circuitry is typically maintained on a host bus adapter (HBA) chip on a printed circuit board structure referred to as a host adapter board (HAB) for connection to a PC host via an expansion slot. California based Adaptec, Inc., as well as the assignee hereof, design and distribute host adapters for making narrow to wide SCSI connections.

Transceivers transmit and receive electrical signals/information on a SCSI bus using single-ended (SE) signal transmission mode protocol or a differential protocol (either high voltage differential, HVD, or low voltage differential, LVD). Since the SE and HVD alternatives are mutually exclusive and the LVD and HVD alternatives are mutually exclusive, a bus can support only all HVD devices or SE/LVD signal transmission devices. In addition to SE, LVD, HVD transceivers and terminators, SE/LVD multimode transceiver and multimode terminator architecture has been designed for operation over a SCSI bus in the event it's expected that a combination of SE and LVD protocol devices will be combined thereon.

Fibre Channel Interconnect

Fibre Channel is a newer interface technology (emerging along with Serial Storage Architecture (SSA) and IEEE P1394) capable of transferring data as fast and faster than an Ultra3 SCSI system can, over fiber optic cabling as well as copper transmission media. Fiber Channel-type host bus adapters are installed into a host computer expansion slot just as SCSI host bus adapters are installed. Fibre channel connections are often associated with the term "loop" (from the name Fibre Channel arbitrated loop) rather than "bus" (as SCSI devices are connected). There are actually other types of Fibre Channel connections, called "point to point" and "fabric." With fibre channel, communication between hosts and devices does not have to be done directly. Instead, users can employ hubs and switches between devices on the Fibre Channel network. Hubs and switches can be used to create Fibre Channel "storage networks". Fibre Channel cabling can be copper (can be up to 30 meters in length) or fiber optic (currently up to 10 Km). In addition, no termination is necessary for fibre channel as is required in SCSI. Fiber optic ports directly placed on a peripheral device allow only for connections to fiber optic cabling. Commercially available adapters exist that allow a SCSI-compliant device to be connected to a Fiber Channel loop.

Conventional Way to Make a Non-RAID Disk a RAID Volume

As shown in FIG. 1, the conventional method by which a 'generic' non-RAID structured hard disk 10 (regardless of the type of interface protocol used to communicate therewith) can be 'converted' into a RAID volume or a RAID-structured disk array can be copied into a different RAID-structured array is by utilizing a large, external separate back-up device 12 in communication with a processor and associated computer memory. The processor (often, the source volume host processor) of device 12 is engaged to read the data originally stored on the source disk 10 into its memory, then structure the data according to the desired RAID Level/mapping and download it to newly-assembled disks (16, 17, 18,19) to create the new/separate RAID array 14. The additional time, effort and the expense of needing, only temporarily for the RAID conversion, a separate high-end back-up device 12, makes this conventional RAID conversion method undesirable as a mechanism by which to convert non-RAID storage media into a RAID volume on a regular basis. The conventional method is simply not a good RAID structure solution for customers of workstations, servers, mainframes, high-end PC's, and so on.

Therefore, a new useful mechanism is needed by which an initially non-RAID storage volume can be converted into a RAID array, and can preferably also convert a storage volume structured in an initial RAID level into a different RAID level, without the need to employ a costly external back-up device (and its associated interconnect hardware). Without reasonable, accurate, and cost-effective solutions at hand for structuring a storage volume into a desired RAID structure in a timely manner, it is very difficult for computer information technologists/specialists to convert a single hard disk, for example, with valuable data into a RAID structure (with its important redundancy/data protection features). As anyone who has tried to recover lost data on a failed disk will readily understand: certain circumstances make it imperative that a RAID array be available for storing valuable data.

SUMMARY OF THE INVENTION

It is a primary object of this invention to provide a system for automatically migrating a portion of a collection of information located on one or more source data carriers (also 'source volume') into an assemblage of data carriers that includes at least a first storage medium and can include the source data carrier. Information from the source data carrier is read into a computer memory, preferably in strips (as small as a single bit, several bytes, or as large a 'block' of information as one chooses) and written to the first (second, third, fourth, fifth, and so on) storage medium in a predetermined structure (e.g., into a RAID structure). A remaining portion of the collection of information (this remaining portion can comprise one or more remaining-sub-portions of the strip(s)) is written to the source data carrier in conformity with the predetermined structure. It is a further object to provide an assemblage of data carriers comprising a first storage medium and a source data carrier; the first storage medium to have a portion of a collection of information originating as a first structure on the source data carrier, and the source data carrier to contain a remaining portion of the first structure collection reordered in conformity with a RAID structure. It is also an object of this invention to provide a method of automatically migrating a portion of a collection of information located on one or more source data carriers to an assemblage of data carriers-once a first sub-portion of a first strip has been written to a first storage medium of the assemblage according to a predetermined structure, a remaining portion of the collection is written to the source carrier so it can become part of the assemblage.

The innovative assemblage of RAID structured data carriers, and associated system and method of automatically migrating a portion of a collection of information located on a source data carrier, as contemplated and described herein, can accommodate: many different storage volumes (having a single or a multitude of individual storage carriers); a wide variety of types of computer interface protocols; and many different types of computerized devices/systems. Furthermore, the simple, effective design allows the system, method, and program code of the invention to be tailored-to, readily installed, and run using currently-available processors and memory.

Unlike the conventional systems currently in use, the innovative assemblage of data carriers, and associated system and method, of the invention utilize the source data carrier on which the data to be converted is initially found to make the source carrier part of the assemblage as structured. None of the currently-available systems take advantage of the availability of the source data carrier. In the spirit of this design, one, two, three, and so on, storage media can be included in the initial source storage volume and/or incorporated in the structured assemblage of data as will be further appreciated.

The advantages of providing the flexible new system, the assemblage of RAID structured data carriers, and associated new method of automatically migrating a portion of a collection of information, as described herein, follow:

(a) Cost Reduction—A separate back-up disk (or other external storage media) is not needed to convert a non-RAID structured storage volume (such as a workstation or server hard drive) into a RAID structured storage volume/array, or to convert a RAID structured storage volume into a different RAID Level structured storage volume/array; plus one less storage medium is needed in the newly structured assemblage of data carriers since the original/source data carrier becomes part of the new assemblage.

(b) Design Flexibility and Versatility—Due to the many different configurations, including the several popular RAID level/mappings (each of which has data-redundancy benefits plus potential as well as real drawbacks), into which data can be structured on an external storage medium (whether the 'storage volume' is encased within a computer housing or accessed as a stand-alone unit), system engineers and information technology specialists of many different computer platforms can readily use the more-flexible data structure conversion solutions offered by the instant invention. The entire non-RAID hard disk of a workstation(s), server(s), PC, etc., or individual partitions of the disk, file systems thereon, and so on, can be converted into a chosen RAID level set. Furthermore, by allowing one the option of including the source data carrier in the final assemblage of carriers the method and system provide even more operational flexibility.

(c) The system, assemblage of data carriers, and associated method aid in reducing inadvertent data loss on a source volume, such as a workstation or server hard disk, by allowing the source volume to be readily converted, in an automatic fashion, into a RAID structured volume (or from one RAID structure volume to another RAID structure). Unlike any conventional process, this powerful novel system and method allows one to optionally include the source in the final structured volume.

(d) Design simplicity—Simplifying the design reduces overall system costs, such as the cost of keeping on-hand a temporary operational back-up tape or disk system and its cabling plus highly-skilled labor and supplier-support costs associated with correctly setting-up/wiring, running, then disassembling the back-up system. Reducing system costs, in-turn reduces the cost to perform the important information-structure conversion of source storage volumes (e.g., from a non-RAID storage volume to a RAID-mapped volume). The instant invention allows for automatic conversion without needing an especially-large memory buffer through which the information is migrated.

(e) Process simplification—The system and method migrate the collection of information of a source data carrier independently of the source carrier's file system and the way the source is originally logically partitioned. Creating a newly-structured volume according to the invention (in the form of an assemblage of data carriers) does not require that specific information in partitions of the source data carrier, such as boot record(s), root directories and associated files, be interpreted during the process.

Briefly described, again, the invention includes a system for automatically migrating a portion of a collection of information located on a source data carrier(s) into an assemblage of data carriers. The system has a computer memory for temporary storage of a first strip of the collection; the assemblage of data carriers has at least a first storage medium to which at least a first sub-portion of the first strip is written from computer memory; and once the portion of the collection has been so migrated according to a predetermined structure, at least a remaining portion of the collection can be written to the source data carrier and ordered in conformity with the predetermined structure (such that the assemblage now further includes at least one of the source data carriers).

Additional further distinguishing features are readily apparent: The collection of information can be initially non-RAID structured or RAID structured, and the structure of the assemblage can be RAID structured (different than the initial structure). The first strip can comprise: a first sub-portion targeted for migration to the first storage medium; a second sub-portion migrated to a second storage medium; a third sub-portion migrated to a third storage medium, and so on for each newly-added storage media of the assemblage; as well as a remaining sub-portion (as part of the remaining portion that gets written back to the source data carrier). Alternatively, the entire first strip (having no information from the remaining portion targeted for the source data carrier), depending on its size, can be written to the first storage medium, a second strip of the collection written to a second storage medium, a third strip of the collection written to a third storage medium, and so on. Physical location information about data written to the assemblage can be added to the storage media or source data carrier. Furthermore, a user interface can be included for entering an input to optionally instruct that a remaining portion of the collection be migrated back to the source data carrier or to at least the first storage medium. One might wish to exclude an obsolete drive from the assemblage.

Also characterized is an assemblage of data carriers having a first storage medium and a source data carrier; at least the first storage medium to contain a portion of a collection of information originating as a first structure on the source data carrier, this portion having been migrated through a computer memory in communication with the source data carrier and written as RAID structured. The source data carrier of the assemblage contains a remaining portion of the first structured collection reordered in conformity with the RAID structure. The information written to the storage medium and source data carrier is, preferably, verified before it leaves computer memory.

Also characterized herein is an associated method of automatically migrating a portion of a collection of information located on source data carrier(s) to an assemblage of data carriers. This method comprises the steps of reading into a computer memory, a first strip of the collection; and once a first sub-portion of the first strip has been written to a first storage medium of the assemblage according to a predetermined structure, writing a remaining portion of the collection to the source data carrier such that it becomes part of the assemblage. The method may operate on the collection of information on the source data carrier whether in a partition-by-partition fashion or independently of any initial logical partitioning of the source storage volume by finding strips of a chosen size via a logical block address, etc. Additional, further distinguishing associated features of the method can be readily appreciated as set forth herein.

Further characterized is a computer executable program code on a computer readable storage medium. The program code has a first program sub-code for reading into a computer memory, a first strip of a collection of information located on a source data carrier, and writing a first sub-portion of said first strip to a first storage medium of an assemblage of data carriers according to a predetermined structure; and a second program sub-code for writing a remaining portion of the collection to the source data carrier. Code for verifying information written to the assemblage can be added.

BRIEF DESCRIPTION OF THE DRAWINGS

For purposes of illustrating the flexibility of design and versatility of the innovative preferred system, assemblage of data carriers, method, and program code, the invention will be more particularly described by referencing the accompanying drawings of embodiments of the invention (in which like numerals designate like parts). The figures have been included to communicate the features of the invention by way of example, only, and are in no way intended to unduly limit the disclosure hereof.

DETAILED DESCRIPTION OF THE PREFERRED EMBODIMENTS

Figure 1:
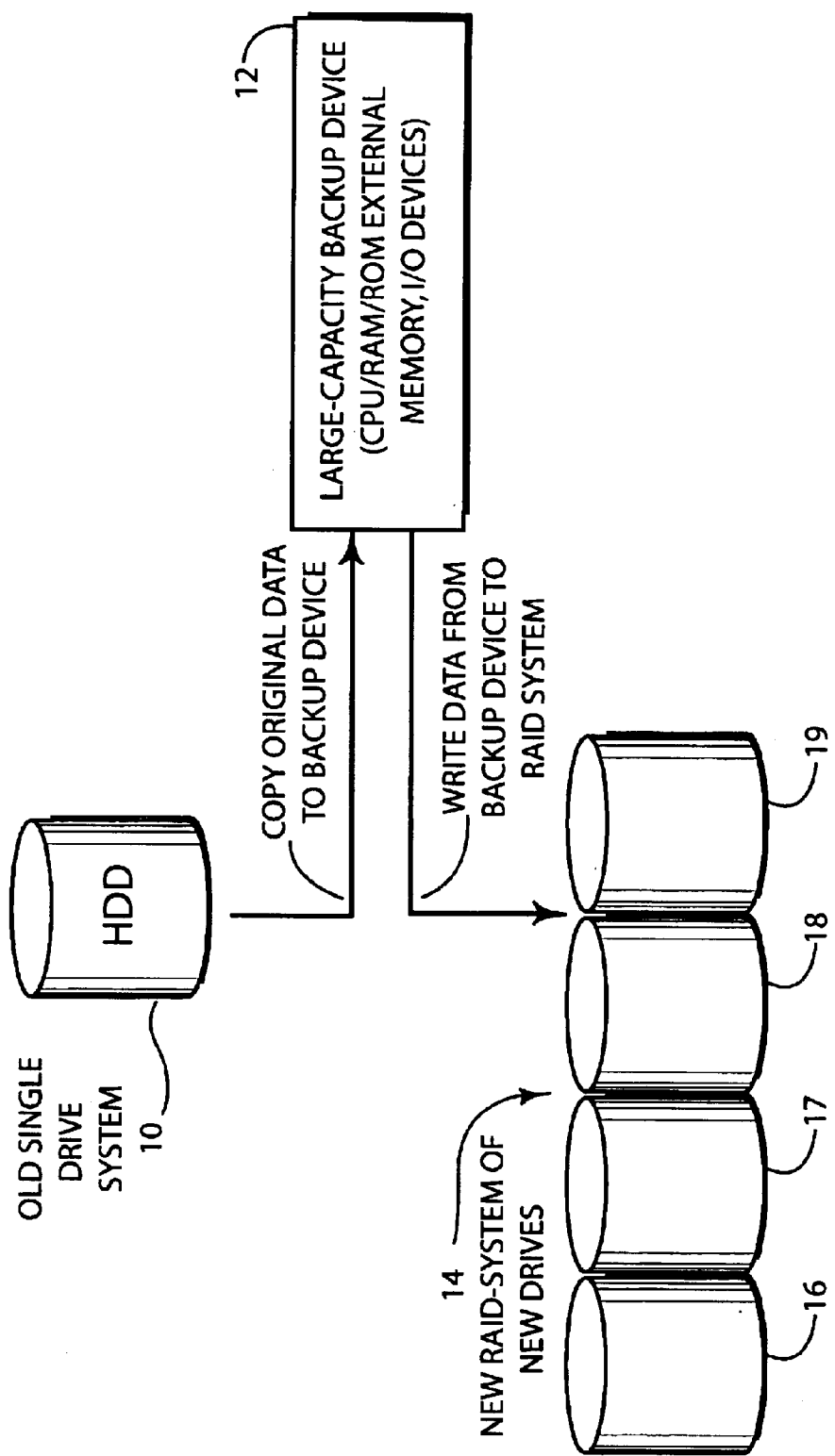
FIG. 1 is a schematic depicting data flow of the known, conventional method of backing-up data on a source storage volume 10 (labeled HDD, hard disk drive) using a back-up device 12 and then writing the data in memory of the back-up device into a RAID system 14.
Figure 2:
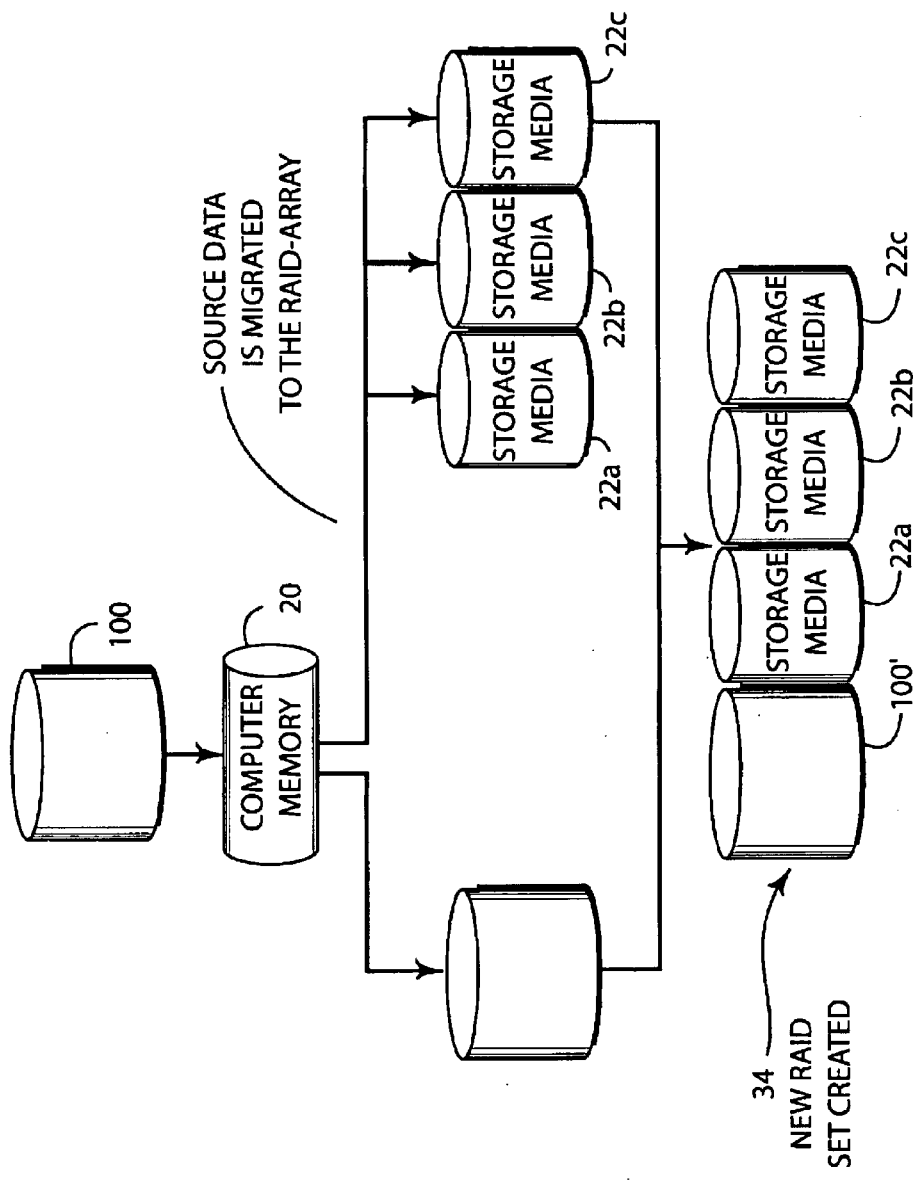
FIG. 2 is a schematic depicting data flow of a system and method of the invention including the source volume 100 and newly-structured assemblage of data carriers 34.

Turning directly to the data flow schematic of a preferred system in FIG. 2, a portion of the collection of information on source volume 100 is migrated through a computer memory 20 and into storage media 22a, 22b, 22c. A remaining portion of the collection of information on source 100 is preferably also written to memory 20 (or a separate memory buffer, not shown) then back to source media 100 to create a newly-structured data carrier 100'. Thus, the media shown at 22a, 22b, 22c as well as data carrier 100' (unlike conventional information conversion systems as explained above) can all become part of the newly structured assemblage of carriers as an array labeled 34. It might be desirable to exclude the source data carrier 100 from the assemblage 34, for example, if the source volume 100 is damaged, unreliable for some reason, or obsolete. In that case, an input may be entered through user interface 26 to communicate to processor 24 that the source-exclusion option be invoked. This adds further value to the innovative system and method of the invention by allowing a user an option to exclude the source data carrier 100. User interface 26 may be any suitable mechanism for accepting user input such as: a touch-sensitive display, keypad or full keyboard, joystick, mouse, voice-recognition device, electronic pen, and so on. Although source volume 100 is depicted as a singe data carrier, it may be comprised of several separate electronically-interconnected data carriers that make up the original volume.

Figure 3A:
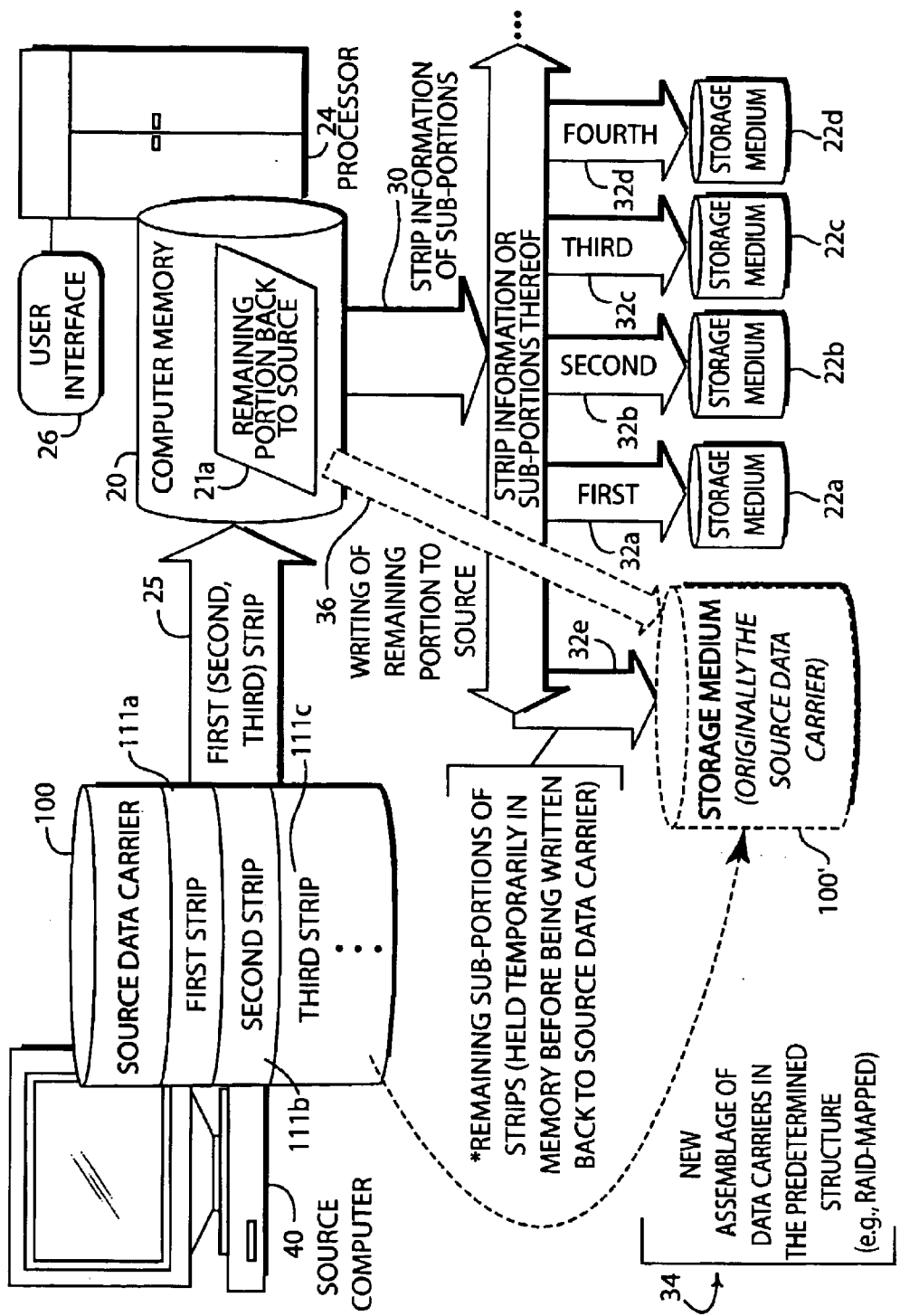
FIG. 3A is a schematic block-diagram depicting data flow in greater detail, of the system, assemblage of data carriers, and method of the invention.

The more-detailed FIG. 3A further illustrates how source carrier strips 111a, 111b, 111c are read 25, for example, one at a time into computer memory (depicted at 20) in communication with a processor 24. Strips such as those identified at 111a–111c might be bit-, byte-, or block-sized at, for example, 32 kBytes, 64 kBytes, 1 Mbyte to 3 Mbytes, or the size of a sector (512 bytes), LBA (logical block address), cylinder, and so on, independent of the size of the memory through which the strip is migrated. Source data carrier/volume 100 (in for example, the 64 Mbytes to 100 Gbyte, and larger, range) can be associated with any type of computer processor such as that found in a personal computer (PC), workstation, server, lower-end mainframe, etc. (labeled 40). The strip, or a sub-portion thereof, is directed 30 to the various available storage media 22a–22d that are in communication with memory 20; this communication can be via an internal bus, IDE (integrated drive electronics), EIDE (enhanced IDE), USB, P1394 bus, ATAPI (AT attachment package interface), SCSI, Fibre Channel, the newer System I/O, utilizing a LAN, WAN, Ethernet (whether by way of remote-means such as a cellular network especially in the event the structured assemblage is remotely located).

The specific order of the writing of strips, or sub-portions of a strip, to storage media 22a–22d can vary such as to optimize the efficiency of information-transfer thereto. However, by way of example, a first sub-portion 32a of a first strip can be sent to medium 22a, then a second sub-portion 32b of the first strip can be written to medium 22b, a third sub-portion 32c of the first strip can be written to medium 22c, and so on, until the sub-portions of the first strip are written—with a remaining-first sub-portion 32e of that first strip held temporarily in memory 20 for transfer to the source carrier 100 after each sub-portion of each strip destined for the storage media 22a–22d has been written accordingly. Alternately, strips 111a–111c can be sized and read such that each entire strip (or a substantial portion of the strip) is migrated through computer memory to a 'target' storage media: First strip 111a through memory to (32a) storage medium 22a, a second strip 111b through memory to (32b) storage medium 22b, a third strip 111c through memory to (32c) storage medium 22c, and so on—with a final strip or series of strips 21a making up a remaining portion of the collection of information on source volume 100, targeted to be written back 36 (and reordered) to produce storage medium 100'. In this way, the assemblage of data carriers 34 can be configured in the predetermined structure (e.g., in a chosen RAID-mapping) entered via suitable user interface (not shown) into host processor 24.

Figure 3B:
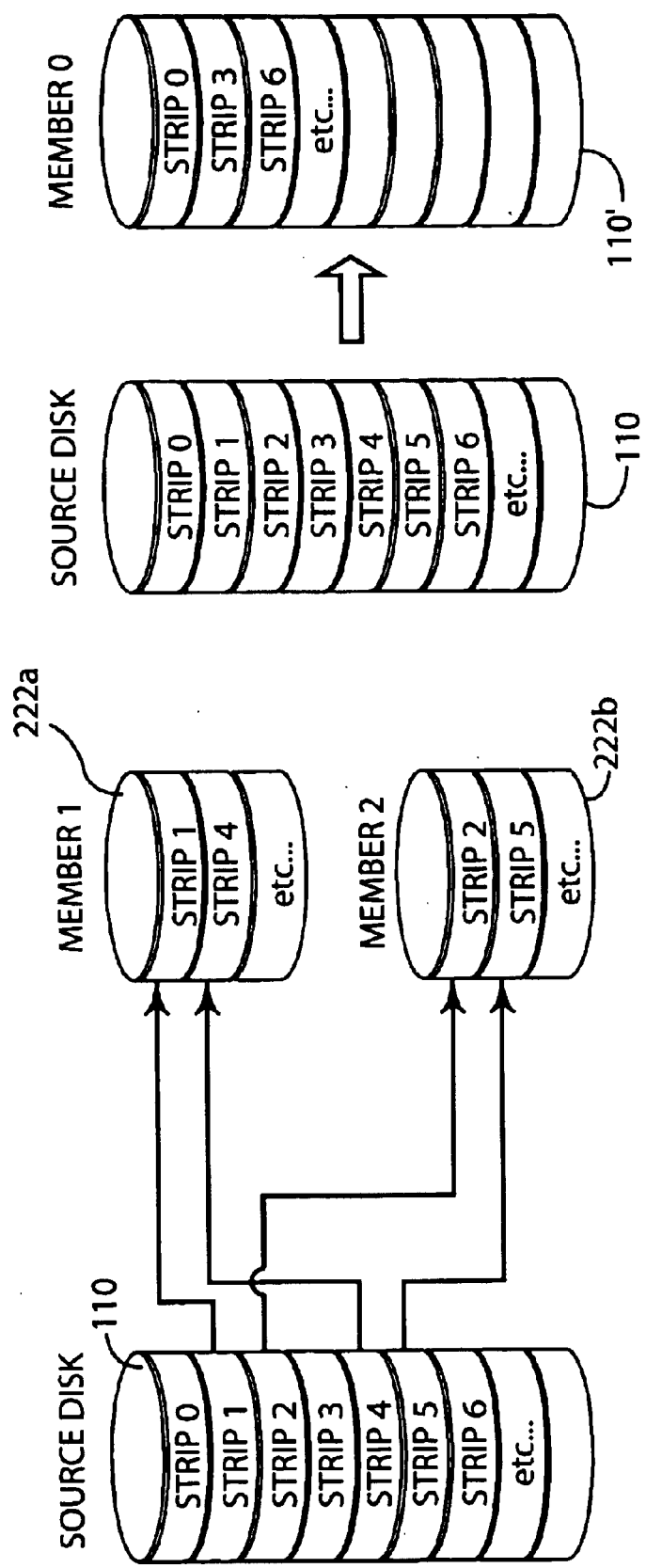
FIG. 3B depicts an alternative embodiment of the invention, specifically the features of the original source volume 110 and after its been ordered 110' according to the invention.

By way of example only, FIG. 3B illustrates further detail of an alternative source data carrier 110 with several strips. Strip 1 and strip 4, for example of similar or varying sizes (see discussion of FIG. 3A), are migrated through suitable memory (not shown for simplicity) to a storage medium 222a; likewise, strip 2 and strip 5 are migrated to storage medium 222b. As mentioned above, the migration of strips of the collection of information on source carrier 110 can be done independent of the source carrier's file system and the way the source volume is originally logically partitioned, if at all. Creating a newly-structured volume according to the invention (in the form of an assemblage of data carriers) does not require that specific information in any original partition of the source data carrier, such as boot record(s), root directories and associated files, be interpreted prior to being written to the assemblage of carriers. Once the portion of the collection of information on source carrier 110 has been migrated to media 222*a*, 222*b* in a fashion such as is discussed herein, the source 110 can be ordered/defragmented ('crunched'—see block 70 in FIG. 4) according to the final predetermined structure (e.g., a specified RAID level) into a storage medium 110' that fits within the newly structured assemblage of carriers such as that at 34 in FIG. 3A.

Figure 4:
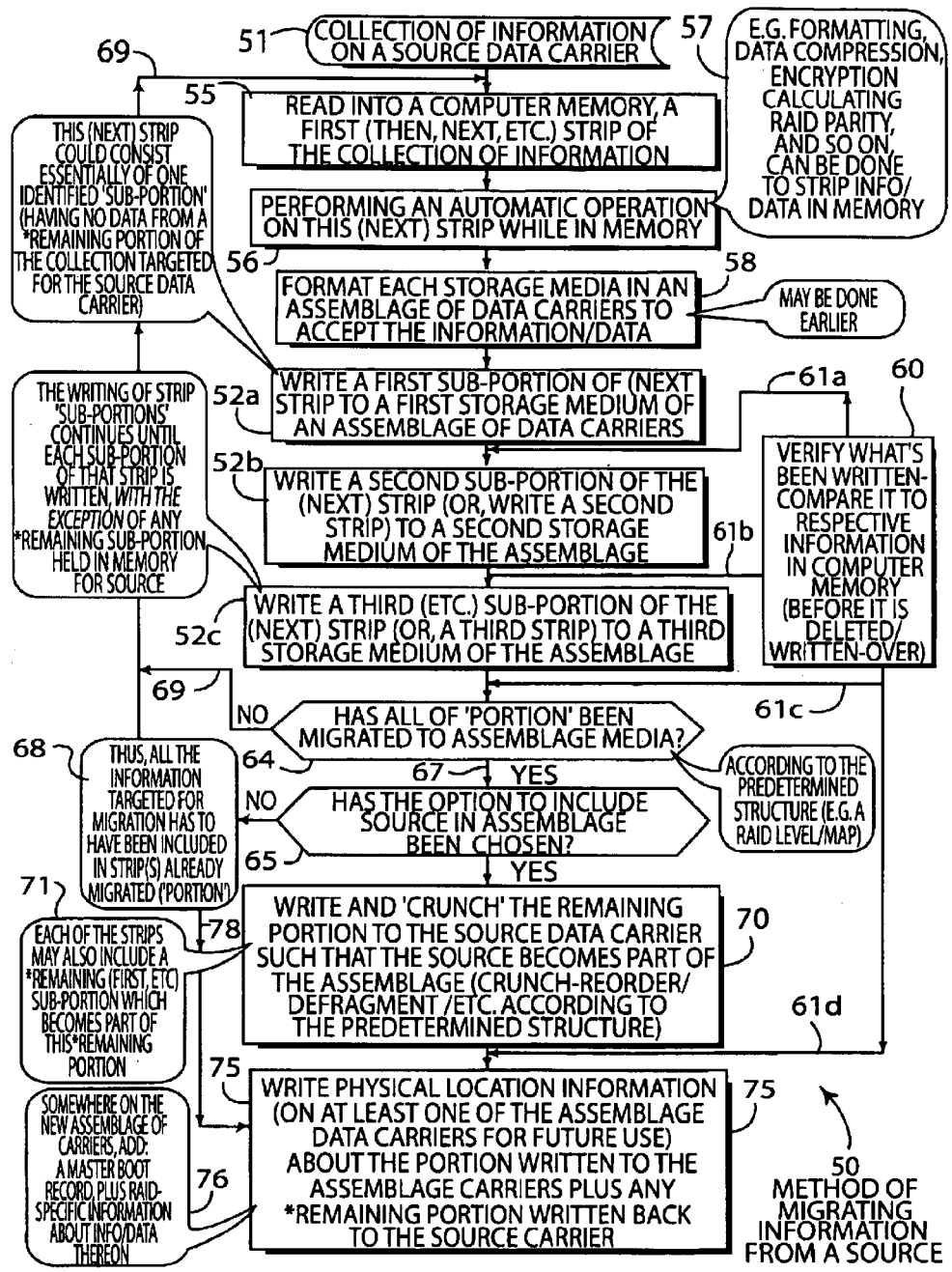
FIG. 4 depicts the method of the invention 50, including its additional further distinguishing features, in a detailed flow-diagram format.

By turning to FIG. 4, preferred and alternative-preferred implementations of a novel system and method 50 of the invention can be better appreciated: Specific novel additional features of the method (plus operation of the system) of the invention, as characterized herein, are readily ascertainable from this detailed flow diagram, as labeled and described. The collection of information that originates on the source volume is represented at 51. A first (or next, as the case may be) strip of the collection is read into memory 55. An automatic operation 56 (such as data formatting, data compression, encryption, calculating RAID parity, etc.) can be performed while the strip(s) is in memory 57. Such operations are well known and often desired and employed in order to make the transfer of information from one external storage to memory (such as random access memory, RAM, or read-only memory, ROM, of a Central Processing Unit, "CPU") and back to an external storage again, a more-efficient process.

Each storage medium (labeled 22*a*–22*e* in FIG. 3A) of the assemblage of data carriers is preferably, at some point prior to accepting information transferred to it from computer memory, formatted (shown in method 50 at box 58 by way of example, only) in conformity with the chosen predetermined structure for the assemblage. A first sub-portion of the current (next) strip read into computer memory is written (box 52*a*) to one of the storage media (e.g., 22*a* in FIG. 3A); a second sub-portion of the current strip in memory can then be written (box 52*b*) to a second storage medium (e.g., 22*b* in FIG. 3A); and likewise a third sub-portion of that strip can be written (52*c*) to a third storage medium (e.g., 22*c* in FIG. 3A), and so on until all of the first (current) strip has been written to the assemblage (34, FIG. 3A), excluding any remaining sub-portion(s) thereof targeted to be written back (32*e*, FIG. 3A) to the source volume (100', FIG. 3A).

Thereafter, if there is additional information that is targeted for migration to one of the storage media (e.g., 22*a*–22*d*, FIG. 3A) which has not yet been transferred to the assemblage data carriers (see decision diamond 64 following arrow 69), the computer memory reads the next strip (back to box 55). Then, jumping to 52*a* (unless data compression, encryption, etc., is performed at 56), consecutive sub-portions of that next strip are written to respective storage media (22*a*–22*d*, FIG. 3A), until all of the strip information targeted for media 22*a*–22*d* (FIG. 3A) is written thereto (arrow 67).

The invention allows for one to choose an important option (65)—to include the source data carrier in the final assemblage of data carriers. The option input can be communicated to processor 24 (FIG. 3A) by way of suitable user interface 26, FIG. 3A. If chosen, any remaining sub-portions of strips temporarily being held in memory for transfer (32*e*, FIG. 3A) to the source data carrier, and/or any remaining portion (21*a*, FIG. 3A) of the collection originally on source 100, can now be written and crunched (box 70 and accompanying note 71) to the source 100 to make it part (at 100', FIG. 3A) of the assemblage 34. Additionally, at one or more of the points in migration process 50 identified by broken arrows 61*a*–61*d*, the information written to assemblage media can be verified (box 60) by comparing it to respective information while still in computer memory. If the option to include source data carrier (100, FIG. 3A) is not exercised, then (box 68) the information targeted for migration (which, as mentioned, can be some portion of the collection originally on source 100) has been transferred to the assemblage (such as that at 34 in FIG. 3A) and following 78, one moves on through process 50.

Finally, as shown here at box 75 and its accompanying note 76, somewhere on the assemblage of data carriers 34 important physical location information is preferably written (e.g., a Master Boot Record as well as 'RAID-specific' information that depends upon the specific media and predetermined structure chosen for the final assemblage of data carriers). As illustrated by the pseudo code illustrated herein by way of example only, the step identified by box 75 in FIG. 4 may be broken down into separate steps labeled 4.) and 6.) in the pseudo code. Additional information such as boot records for each logical partition/disk volume created, root directory(ies), and so on, as migrated in strip/sub-portion fashion according to the invention to assemblage media 22*a*–22*d* and as written to source carrier 100', would correspondingly be found on the assemblage.

By way of example only, high-level pseudo code describing a method 50 (FIG. 4) allowing migration of a non-RAID normal physical boot source disk into a RAID boot volume having at least one or more 'secondary' storage disks (22*a*–22*d*) follows. In this example, the source disk is included in the RAID striped set (i.e., the option to do so has been exercised). First, generally, the processes has been broken down as follows:

1.) Initialization is performed to obtain and validate specific information pertaining to the migration.
2.) Prepare each secondary disk for migration.
3.) Migrate data from the source disk through memory to each secondary disk.
4.) Write RAID specific information to each secondary disk.
5.) Move data FROM and TO the source disk (crunch the source disk).
6.) Write RAID specific information to the source disk.

Glossary of Terms Used for Purposes of Pseudo Code:

Volume—refers to a logical RAID representation of a physical partition.
Strip—refers to a sequential number of bytes which spans all disks included in the striped set.
Strip Set—refers to all strips included in a volume.
Stripe—refers to the subportion of the strip, which is located on a specific disk in the striped set.
Partial stripe—refers to a subportion of a stripe, which is located on a specific disk in the striped set.
Column—refers to the portion of a strip set, associated with a particular physical disk.
CHS—"Cylinders Heads Sectors", which identifies how data is laid out on a specific physical disk.
LBA—"Logical Block Address", which identifies the location of a specific sector on a physical disk.

Physical LBA—the true LBA which the physical disk uses to locate data for a specific sector.

MBR—"Master Boot Record" the (single) sector located on a specific physical disk that identifies any partitions on the physical disk, and may contain code to boot from.

Virtual MBR—refers to a virtualized MBR which represents all logical, virtualized partitions for a specific set of volumes contained in one or more strip sets. One virtual MBR may represent multiple physical disks. The virtual MBR may also contain code to boot from.

1.) Initialization before migration to validate and initialize data pertaining to the migration.

a.) Allocate memory to store VolumeInfo structures. There is one VolumeInfo structure for each partition to be migrated. The VolumeInfo stucture contains information specific to the new volume to be created from each partition.

b.) Sort the partitions based upon the physical disk location.

c.) Calculate the physical CHS of the source disk, using the disks partition table in the disks MBR, and the size of the disk.

d.) Calculate the physical CHS of all secondary disks, using an algorithm which will maximize the number of sectors per track in the CHS.

e.) Calculate values pertaining to the location of RAID specific structures.

Notes for above 1.):

The last stripe of a partition may be a partial stripe. When using partial stripes, the first 'n' disks will get a full stripe with priority given to the source disk, such that the last secondary disk may have one less stripe than the source disk—this results in the last column of each volume possibly having a different number of sectors (FULL, NONE, or 'n').

The physical CHS on the source is not changed, and the starting LBA is not changed on the source (first virtual LBA=first physical LBA on first partition).

The first physical LBA to contain data included in a volume, on each secondary disk is the same. The CHS on all secondary disks have the same number of sectors per track, but may have a different number of heads per cylinder, or cylinders per disk. To do this we use a CHS that uses the maximum number of sectors per track for all secondary disks.

2.) Prepare each secondary disk for migration.

Here, for each secondary disk:

a.) Clear the area on each secondary disk which may be used to contain RAID specific information.

b.) Write a valid MBR on each secondary disk which identifies each disk being of type "RAID".

3.) Migrate data from the source disk through memory to each secondary disk.

Here, for each partition (and each volume):

Set start source LBA on source for this partition

Set start destination LBA on secondary for this partition (Note: this is the same for all secondary drives)

Set the sector count to transfer from the source to the secondary disk (Note: this is one stripe/64 K bytes)

4.) Write RAID specific information to each secondary disk.

5.) Move data FROM and TO the source disk (crunch the source disk).

This will crunch the source disk, which will move data from higher LBA addresses to lower LBA addresses on the source disk. This essentially copies over all data that was previously copied to all secondary disks. We are copying data from partition LBA addresses to volume LBA addresses.

Set the source Device to the first primary disk

Set the destination Device to the first primary disk

For each partition (and each volume):
{
   Set start SourceLBA on source disk for this partition
   Set start DestinationLBA on source disk for this partition (Note: this is same for all secondary drives)
   Set the sector count to transfer from/to the source disk (Note: this is one stripe or 64 K bytes)
   For each stripe in this partition:
   {
      If this is the very first stripe, then skip it, since the Source LBA equals the Destination LBA, so go to the next stripe
      Else
      {
         If the last stripe for this column is a partial stripe
         {
            Set the sector count to transfer to the number of sectors in this stripe (<64 K bytes).
         }
         Else the sector count is a full stripe (64 K Bytes).
         Transfer the data from the source LBA to the destination LBA
         Set the destination device to the next secondary device
         Increment the source LBA by the number of sectors transferred
      }
      add the stripe size (64 K) to the DestinationLBA
      add the strip size to the SourceLBA
         (Note: strip size=stripe size*number of disks in stripe set)
   }
}

6.) Write RAID specific information to the source disk. end.

The embodiment features depicted in FIG. 4, in operation, can be performed on a partition-by-partition basis (whereby one partition at a time is transferred to the assemblage of data carriers according to method 50) or one can carry-out method 50 independent of any original logical partitions set up on the source data carrier (whereby any partition of the original source volume becomes 'transparent' to the transfer or migration of information according to method 50).

The preferred and alternative system and assemblage of data carriers illustrated and described in connection with FIGS. 1–4 are operational in connection with conventional storage medium/media, whether magnetic (diskettes, hard disks, Iomega's ZIP®/JAZ®/Click™ disks, tapes, drums, core, thin-film, etc.), optic (CD-ROM, CD-E, CD-R, CD-RW, DVD, and other devices whereby readout is with a light-source and photodetector), magneto-optic (media for which optical properties can be changed by an applied magnetic field—used in high end drives), including those devices into/onto which information (such as data) can be read/copied and held. Conventional computer platforms can accommodate the instant invention and conventional computer memory is suitable (it is not critical that the computer memory size accommodate the whole of the strip-size chosen for migration). As mentioned, strip size is flexible and can be as small as a bit to as large as a cylinder or more—and one might choose to define a strip-size such that multiple strips can be read into memory at once such that strip-sized 'sub-portions' thereof are written to assemblage storage media. And, while hardware-RAID (see discussion in the Background section above) typically appears as a SCSI storage device, to carry out the invention as contemplated herein the type of interface protocol used is not critical. By way of reference, only: data includes any representation of characters and/or symbols or analog quantities/information to which meaning may be assigned that can serve as input for processing; data compression is a technique of reducing the number of binary digits required to represent data; data carrier is any medium/media on which data can be recorded/written (and often is transportable).

While certain representative embodiments and details have been shown merely for the purpose of illustrating the invention, those skilled in the art will readily appreciate that various modifications may be made without departing from the novel teachings or scope of this invention. Accordingly, all such modifications are intended to be included within the scope of this invention as defined in the following claims. Although the commonly employed preamble phrase "comprising the steps of" may be used herein, or hereafter, in a method claim, the Applicants in no way intends to invoke Section 112 ¶6. Furthermore, in any claim that is filed hereafter, any means-plus-function clauses used, or later found to be present, are intended to cover the structures described herein as performing the recited function and not only structural equivalents but also equivalent structures.

What is claimed is:

1. A system for automatically migrating a portion of a collection of information located on a source data carrier into an assemblage of data carriers, comprising:
    a computer memory for temporary storage of a first strip of said portion of said collection of information;
    said assemblage of data carriers having at least a first storage medium to which at least a first sub-portion of said first strip is written from said computer memory; and
    at least a remaining portion of said collection of information that is written to said source data carrier and ordered in conformity with a predetermined structure once said portion of said collection has been migrated according to said predetermined structure;
    said assemblage of data carriers further comprising a second storage medium to which at least a second sub-portion of said first strip is written; and
    said remaining portion comprising a remaining-first sub-portion of said first strip, said remaining-first sub-portion being written back to said source data carrier from said computer memory.

2. The system of claim 1 wherein:
    said assemblage of data carriers further comprising a third storage medium to which at least a third sub-portion of said first strip is written;
    said first sub-portion being written to said first storage medium prior to said writing of said second sub-portion and said writing of said third sub-portion.

3. The system of claim 2 wherein:
    a first sub-portion of a second strip of said collection of information has been written to said first storage medium from said computer memory;
    a second sub-portion of said second strip has been written to said second storage medium, and a third sub-portion of said second strip has been written to said third storage medium; and
    a remaining-second sub-portion of said second strip has been written back to said source data carrier from said computer memory.

4. A system for automatically migrating a portion of a collection of information located on a source data carrier into an assemblage of data carriers, comprising:
    a computer memory for temporary storage of a first strip of said portion of collection of information;
    said assemblage of data carriers having at least a first storage medium to which at least a first sub-portion of said first strip is written from said computer memory;
    at least a remaining portion of said collection of information that is written to said source data carrier and ordered in conformity with a predetermined structure once said portion of said collection has been migrated according to said predetermined structure;
    said first strip having no information from said remaining portion of said portion of collection of information and consists essentially of said first sub-portion; and
    said assemblage of data carriers further comprising a second storage medium to which at least a second strip of said portion of said collection of information is written after said first sub-portion has been written to said first storage medium;
    said assemblage of data carriers further comprising a third storage medium to which at least a third strip of said portion of said collection is written, wherein said source data carrier is a storage disk, said collection of information is non-RAID structured, said predetermined structure is a RAID architecture;
    said first, second, and third storage media are each formatted accordingly for said RAID architecture; and
    said source data carrier further comprising:
        physical location information about said information written from said computer memory to said first, second, and third storage media and said source data carrier;
        said physical location information to comprise RAID-specific information about said assemblage of data carriers.

5. A system for automatically migrating a portion of a collection of information located on a source data carrier into an assemblage of data carriers, comprising:
    a computer memory for temporary storage of a first strip of said portion of said collection of information;
    said assemblage of data carriers having at least a first storage medium to which at least a first sub-portion of said first strip is written from said computer memory; and
    said source data carrier containing at least a remaining portion of said portion of said collection of information once said portion of said collection of information has been migrated according to a predetermined structure and ordered in conformity with said predetermined structure, wherein said computer memory is in communication with a processor capable of accessing a set of instructions for use to perform an automatic operation on said first sub-portion of said first strip prior to being so written; and,
    said operation is selected from the group consisting of: reformatting, data compression, encryption, and calculating RAID-mapped parity.

6. The system of claim 5 wherein said source data carrier is a storage disk;
    said portion of said collection of information is a RAID structure;
    said predetermined structure is a RAID architecture different from said RAID structure;

at least one of said assemblage of data carriers comprising a master boot record for said RAID architecture of said assemblage; and said processor perceives said assemblage of data carriers as a single virtual disk.

7. A system for automatically migrating a portion of a collection of information located on a source data carrier into an assemblage of data carriers, comprising:

a computer memory for temporary storage of a first strip of said collection;

said assemblage of data carriers having at least a first storage medium to which at least a first sub-portion of said first strip is written according to a predetermined structure, from said computer memory;

a user interface for entering an input to optionally instruct that a remaining portion of said collection be migrated back to said source data carrier or to at least said first storage medium, according to said predetermined structure;

said assemblage of data carriers further comprising second and third storage media; and said remaining portion comprising a remaining-first sub-portion of said first strip, said input instructing that said remaining-first sub-portion be written back to said source data carrier from said computer memory and ordered in conformity with said predetermined structure.

8. An assemblage of data carriers having a first storage medium and a source data carrier, comprising:

at least said first storage medium to contain a portion of a collection of information originating as a first structure on said source data carrier, said portion having been migrated through a computer memory in communication with said source data carrier and written to said first storage medium in conformity with a RAID structure;

said source data carrier containing a remaining portion of said first structured collection reordered in conformity with said RAID structure;

a first strip of said collection of information comprising a first sub-portion which is written to said first storage medium and a second sub-portion which is written to a second storage medium;

said remaining portion comprising a remaining-first sub-portion of said first strip that is written back to said source data carrier; and at least one of said assemblage of data carriers further containing physical location information about said portion and said remaining portion as structured.

9. An assemblage of data carriers having a first storage medium and a source data carrier, comprising:

at least said first storage medium that contains a portion of a collection of information originating as a first structure on said source data carrier, said portion having been migrated through a computer memory in communication with said source data carrier and written to said first storage medium in conformity with a RAID structure;

said source data carrier containing a remaining portion of said first structured collection reordered in conformity with said RAID structure, wherein a first strip of said-collection of information is written to said first storage medium, a second strip of said collection is written to a second storage medium, a third strip of said collection is written to a third storage medium; and a verification of each said strip as written, is performed by comparison to respective strip information in said memory.

10. Said assemblage of data carriers of claim 9 wherein:

said first structure is a non-RAID structure;

said physical location information comprising a master boot record and RAID-specific information;

said computer memory is also in communication with a user interface and a processor capable of accessing a set of instructions for use in performing an automatic operation on said first, second, and third strips prior to being so written;

said operation being selected from the group consisting of: reformatting, data compression, encryption, and calculating RAID-mapped parity.

11. A method of automatically migrating a portion of a collection of information located on a source data carrier to an assemblage of data carriers, comprising the steps of:

writing a first strip of said portion of said collection of information into a computer memory;

writing a remaining portion of said collection of information to said source data carrier such that it becomes part of said assemblage, once a first sub-portion of said first strip has been written to a first storage medium of said assemblage of data carriers according to a predetermined structure;

said step of writing a remaining portion to said source data carrier further comprising:

ordering said remaining portion in conformity with said RAID architecture;

writing at least a second sub-portion of said first strip to a second storage medium of said assemblage; and writing a remaining-first sub-portion of said first strip back to said source data carrier from said computer memory, wherein said source data carrier is a storage disk and said collection of information is non-RAID structured and said predetermined structure is a RAID architecture.

12. The method of claim 11 further comprising:

writing at least a third sub-portion of said first strip to a third storage medium of said assemblage;

wherein said first sub-portion is written to said first storage medium prior to said writing of said second sub-portion and said writing of said third sub-portion.

13. The method of claim 12 further comprising the steps of:

writing a first sub-portion of a second strip of said portion of said collection of information to said first storage medium from said computer memory;

writing a second sub-portion of said second strip to said second storage medium;

writing a third sub-portion of said second strip to said third storage medium; and writing a remaining-second sub-portion of said second strip back to said source data carrier from said computer memory.

14. A method of automatically migrating a portion of a collection of information located on a source data carrier to an assemblage of data carriers, comprising the steps of:

writing a first strip of said portion of said collection of information into a computer memory;

writing a remaining portion of said collection of information to said source data carrier such that it becomes part of said assemblage, once a first sub-portion of said first strip has been written to a first storage medium of said assemblage of data carriers according to a predetermined structure;

said first strip has no information from said remaining portion of said collection of information and consists essentially of said first sub-portion; and writing a second strip of said portion of said collection of information into said computer memory;

writing said second strip to a second storage medium of said assemblage; and, verifying each of said strips after being written, by comparing to respective strip information in said computer memory.

15. The method of claim 14 further comprising the steps of:

formatting each of said first and second storage media accordingly for said RAID architecture;

performing an automatic operation on said first strip, said second strip, and said remaining portion while in said computer memory prior to being written to said assemblage; and, wherein said portion of said collection of information is non-RAID structured and said predetermined structure is a RAID architecture.

16. The method of claim 15 wherein said step of performing an automatic operation further comprises:

calculating RAID-mapped parity accordingly for said RAID architecture; and, wherein each of said source data carrier and said first storage medium is a storage disk.

17. A method of automatically migrating a portion of a collection of information located on a source data carrier to an assemblage of data carriers, comprising the steps of:

writing a first strip of said portion of said collection of information into a computer memory;

writing a remaining portion of said collection of information to said source data carrier such that it becomes part of said assemblage, once a first sub-portion of said first strip has been written to a first storage medium of said assemblage of data carriers according to a predetermined structure;

writing physical location information about said portion and said remaining portion as structured, to at least one of said assemblage of data carriers, wherein said portion of said collection of information is RAID structured and said predetermined structure is a RAID architecture different from said RAID structure.

18. The method of claim 17 wherein said step of writing a remaining portion of said portion of said collection of information to said source data carrier further comprises:

writing a remaining-first sub-portion of said first strip back to said source data carrier from said computer memory;

writing at least a second sub-portion of said first strip to a second storage medium of said assemblage;

said physical location information comprising a master boot record and RAID-specific information and said at least one of said assemblage of data carriers is said source data carrier.

19. Computer executable program code on a computer readable storage medium, said program code comprising:

first program sub-code for reading a first strip of a collection of information located on a source data carrier into a computer memory, and writing a first sub-portion of said first strip to a first storage medium of an assemblage of data carriers according to a predetermined structure;

a second program sub-code for writing a remaining portion of said first strip of said collection of information to said source data carrier;

wherein said first strip has no information from said remaining portion and consists essentially of said first sub-portion; and said first program sub-code comprising instructions for:

reading into said computer memory a second strip of said collection of information, writing said second strip to a second storage medium of said assemblage, and verifying each of said strips after being so written, by comparing to respective strip information in said computer memory.

* * * * *